(12) United States Patent
Lindsey (10) Patent No.: US 7,004,910 B2
(45) Date of Patent: Feb. 28, 2006

(54) SYSTEM AND METHOD FOR MONITORING BODY TEMPERATURE

(75) Inventor: Carol Lindsey, Austin, TX (US)

(73) Assignee: Alert Care, Inc, Austin, TX (US)

( * ) Notice: Subject to any disclaimer, the term of this patent is extended or adjusted under 35 U.S.C. 154(b) by 126 days.

(21) Appl. No.: 10/248,041

(22) Filed: Dec. 12, 2002

(65) Prior Publication Data

US 2004/0116822 A1    Jun. 17, 2004

(51) Int. Cl.
    *A61B 5/00*    (2006.01)
(52) U.S. Cl. .................. 600/549; 600/301; 128/903
(58) Field of Classification Search .......... 600/300, 600/549, 301; 374/100; 128/903
    See application file for complete search history.

(56) References Cited

U.S. PATENT DOCUMENTS

| | | | |
|---|---|---|---|
| 4,302,971 A | | 12/1981 | Luk |
| 4,595,020 A | | 6/1986 | Palti |
| 5,050,612 A | * | 9/1991 | Matsumura .................. 600/483 |
| 5,844,862 A | * | 12/1998 | Cocatre-Zilgien ............ 368/10 |
| 6,024,575 A | | 2/2000 | Ulrich |
| 6,218,946 B1 | | 4/2001 | Chao Jung |
| 6,220,750 B1 | | 4/2001 | Palti |
| 6,371,927 B1 | * | 4/2002 | Brune et al. ................ 600/549 |
| 6,373,392 B1 | * | 4/2002 | Au .......................... 340/573.1 |
| 2001/0044588 A1 | * | 11/2001 | Mault ........................ 600/549 |
| 2002/0013538 A1 | * | 1/2002 | Teller ........................ 600/549 |
| 2003/0208156 A1 | * | 11/2003 | Pham et al. ................ 604/113 |

* cited by examiner

Primary Examiner—Max F. Hindenburg
Assistant Examiner—Jonathan Foreman
(74) Attorney, Agent, or Firm—Taylor Russell & Russell, P.C.

(57) ABSTRACT

The system comprises one or more sensor devices, where each sensor device is capable of measuring a temperature at a known location of a body of a human or other animal. Each sensor transmits a temperature measurement value and sensor identification to a monitor device. The monitor device receives the temperature measurement value and sensor identification, and computes an adjusted temperature value based upon the position of the measuring sensor, body age, and time of day. The adjusted temperature value is tested for alarm conditions and displayed for use by a caretaker.

42 Claims, 11 Drawing Sheets

| FIELD | LENGTH | DEFINITION |
|---|---|---|
| ID # | 2 bytes | Sensor ID number assigned within this monitor |
| Unique ID | 4 bytes | Unique sensor ID assigned during sensor manufacture |
| Sensor Position | 1 byte | Indicates where sensor is located on a body |
| Age | 1 byte | Indicates Age of Body |
| Upper Limit | 2 bytes | Upper alarm limit |
| Lower Limit | 2 bytes | Lower alarm limit |

| FIELD | LENGTH | DEFINITION |
|---|---|---|
| End | 1 bit | When set, indicates that this is the last table data entry |
| New Entry | 1 bit | Indicates a new entry for sensor ID #n |
| ID # | 6 bits | Sensor ID # |
| Status | 1 byte | Sensor ID #(n) status |
| Measured Temp | 2 bytes | Absolute temperature |
| Adjusted Temp | 2 bytes | Adjusted temperature |
| Time HH:MM | 2 bytes | Time stamp in *Hour Hour : Minute Minute* format |
| Date DD:MM | 2 bytes | Day stamp in *Day Day : Month Month* format |

| FIELD | LENGTH | DEFINITION |
|---|---|---|
| Sync | 1 byte | Predefined |
| Preamble | 1 byte | Predefined |
| ID | 4 bytes | Unique ID assigned during sensor manufacture |
| Temp | 2 bytes | Temperature data |
| Flags | 1 byte | Status flags |
| Batt | 2 bytes | Estimated remaining battery life |
| CRC | 2 bytes | Cyclic redundancy check |

Figure 11B

SYSTEM AND METHOD FOR MONITORING BODY TEMPERATURE

BACKGROUND OF INVENTION

The invention relates generally to the field of healthcare monitoring, and more particularly to a system and method for wireless temperature monitoring of human or other animals in a home, clinical or institutional setting. It provides a capability of adjusting temperature readings depending upon a body age, a temperature sensor position on the body, and time of day.

One of the most common methods of monitoring the condition of a human or other animal body is by monitoring the body temperature. This is particularly important when a body is suffering from an illness, and particularly febrile or fever producing infections. Mercury filled glass thermometers have historically been the standard for measuring body temperature. Using conventional thermometers, body temperature is most accurately measured by taking oral, tympanic (ear), axillary (armpit), or rectal temperature readings. Because of the potential health and safety risk resulting from the use of mercury filled glass thermometers and the reduction in the price of digital thermometers, consumers are increasingly turning to digital thermometers distributed by large drugstore chains and discount department stores for monitoring body temperature. Because of the large number of children under the age of five years and the growing aging population in the United States, there is a need for new temperature monitoring products that are medically accurate, safe, comfortable, easy to use, and operationally reliable.

While the present invention is applicable to people of all ages, it is more likely to find application in monitoring body temperatures of children, elderly individuals and those suffering from an illness. Children under the age of five who are kept at home generally encounter at least six febrile infections a year. This number increases by about fifty percent if the child attends a daycare center and is exposed to other children. Even though this number decreases somewhat between the ages of five and sixteen years, it is still common to experience several episodes of febrile infections per year at age sixteen. Since young children are oftentimes unable to understand or communicate when they may urgently need assistance, parents and other caretakers must be vigilant to determine the need for medical evaluation or therapy for these children. This is especially true at night when parents are apt to be sleeping. Although excessive or rapidly increasing temperature of the body is a more common cause of health concern, it is oftentimes equally important to monitor low or rapidly decreasing body temperature to be in a position to take remedial action, especially in the case of elderly patients.

Since caretakers may also be family members of the sick as well as professional caretakers, they may also require rest and schedule flexibility in order to handle the demands of the sick family member as well as other demands and responsibilities of home and work. This often requires that the family caretaker endure an interrupted nights sleep in order to monitor a sick family member's temperature on a regular basis throughout the night, even though the sick family member's temperature remains within a nominally acceptable range. This regimen of repeated temperature measurements may be further compounded by diurnal variations in a patient's temperature as well as temporary responses to fever-reducing drugs, even though the fever appears to have subsided. This requirement for repeated temperature measurements also disrupts the patient's sleep when using conventional or digital thermometers. The result may be missed temperature measurements and sleep deprivation for both the caretaker and patient.

SUMMARY OF INVENTION

The present invention provides a method and system for monitoring body temperature that is medically accurate, safe, comfortable, easy to use, and operationally reliable. It provides not only a continuous monitoring of body temperature, it also provides for notifying a caretaker when adjustable temperature alarm limits are exceeded. This reduces the time required for monitoring temperature by professional caretakers and enables family caretakers to get an uninterrupted night's sleep, if temperature alarm limits are not exceeded. It also enables the patient to get an uninterrupted night's sleep if temperature alarm limits are not exceeded. Another medically important parameter to monitor is the rate of change of body temperature. Alarm limits may be set for notifying a caretaker when temperature rate of change exceeds the adjustable alarm limits. The system may be readily used in an institutional, clinical, or home setting, and may be used to monitor a single temperature sensor affixed to a body or a multitude of temperature sensors.

The invention is a temperature monitoring system consisting of a small sensor, a transmitter, and a receiver. The sensor may be attached to various locations on a body. There are numerous methods of attaching the sensor in a position to sense body temperature, including placement in a pocket of an adhesive strip or in a pocket pouch sewn into the armpit area of a person's shirt or nightgown. An elasticized panel is sewn into the shoulder armpit area in a manner that would not restrict the wearer's freedom of movement but would exert steady and gentle pressure on the sensor to keep it against the body. The sensor may also be secured to an appendage or other body locations. The cloth between the sensor and the skin, if any, is thin and highly heat conductive so as to allow accurate temperature readings. The sensor can be removed from the garment for washing but is difficult for a child to remove due to the number and size of snaps on the pocket. The adhesive strip is intended for children who may be tempted to remove a probe or other sensor. The garment is intended for children who may be tempted to remove a sensor if an adhesive strip was used. A sub-cutaneous version of the sensor may also be positioned under the skin of a human or other animal.

The system may provide alerts to a caretaker by computing two different body temperature parameters, absolute temperature alarm limits and temperature trend alarm limits. If the body temperature exceeds a specified maximum or falls below a specified minimum level, an alarm may be activated. If the body temperature changes at a specified rate or faster, the alarm will also be activated. Different audible alarm sounds may be used, depending on why the alarm was activated. The system may also include a low battery alarm. Alarms may also provide for an escalating audible volume.

The monitor houses the means to either receive temperature readings from the sensor using unidirectional communications or actively seek readings from the sensor upon request or at certain time intervals, using bi-directional communications. The monitor is located in the vicinity of a caretaker and detects whether an alarm condition exists based upon the temperature readings it receives from the sensor. The monitor may be easily carried by a caretaker throughout the vicinity of one or more sensors and may house an LCD display that indicates sensor identification, adjusted temperature, temperature trend, and a temperature time stamp. The monitor may include a memory function so recent temperatures could be displayed, and an alarm that sounds under the conditions described above. A version of the monitor may also include an annunciator for announcing temperature values.

The system comprises at least one monitor device and one or more temperature sensors that communicate with the monitor device using wireless technology. The monitor device is capable of displaying current temperature, and temperature trends in either Celsius or Fahrenheit degrees, as well as identifying the selected sensor and time of day. The method also allows for adjustment of measured temperature due to locating a temperature sensor on different parts of a body, the age of the body, and time of day. The monitor device provides a means for adjusting temperature alarm limits and sounding an alarm when the temperature alarm limits are exceeded.

Using conventional thermometers, body temperature is most accurately measured by taking oral, tympanic (ear), axillary (armpit), or rectal temperature readings. This is because the temperature measured at these locations is closer to the core temperature of a person's body. Since it is not practical to locate a sensor at some of these locations for periods of up to twelve hours or more, more practical locations for sensor placement include arm, trunk, leg or forehead.

Sensors may be positioned either cutaneously or sub-cutaneously. However, there are varying differences between temperatures measured at these locations and the core temperature of a person's body. Since these differences are predictable, the present invention may use sensor location, body age, and time of day to adjust the measured temperature from the sensor to an adjusted body core temperature, which is a more meaningful measure of body temperature for determining medical condition and diagnosing illnesses.

A method having features of the present invention comprises a method for monitoring body temperature that comprises the steps of measuring one or more temperature values by sensors at known locations on one or more bodies, transmitting the measured temperature values and corresponding sensor identifications from the sensors to a monitoring device, receiving the measured temperature values and corresponding sensor identifications by the monitoring device, computing adjusted temperature values from the measured temperature values based on the age, time of day, and known body locations of the corresponding sensors, and displaying the adjusted temperature values for use by a caretaker. The step of measuring may further comprise measuring at predetermined time intervals, and the step of transmitting may further comprise transmitting at the predetermined time intervals. The step of measuring may further comprise measuring in response to requests received from the monitor, and the step of transmitting may further comprise transmitting in response to the requests received from the monitor. The method may further comprise the step of calculating estimated remaining battery life of each sensor and transmitting the estimated battery life from each sensor to the monitoring device. The method may further comprise the step of detecting sensor errors/status, setting sensor error/status flags, and transmitting the sensor error/status flags from each sensor to the monitoring device. The method may further comprise the step of activating a sensor status indicator. The method may further comprise the step of switching the sensor to a low power mode when not measuring and transmitting. The step of transmitting the measured temperature values may comprise transmitting the measured temperature values via a wireless communication link, and the step of receiving the measured temperature values may comprise receiving the measured temperature values via a wireless communication link. The step of transmitting the measured temperature values may comprise transmitting the measured temperature values via a wireless area network, and the step of receiving the measured temperature values may comprise receiving the measured temperature values via a wireless area network. The step of displaying the adjusted temperature values may comprise displaying the adjusted temperature values via a multi-line display. The step of displaying the adjusted temperature values may comprise displaying the adjusted temperature values on a remote host display. The method may further comprise the step of selecting a sensor identification for displaying adjusted temperature values using a programmable keypad. The method may further comprise the step of providing visual alarm indication. The method may further comprise the step of providing audible alarm indication. The method may further comprise the step of setting upper and lower alarm limit values. The method may further comprise the step of setting upper and lower trend alarm limit values. The method may further comprise the step of computing adjusted temperature values from the measured temperature values based on the age of the body and time of day. The method may further comprise the step of positioning the sensors at locations selected from the group consisting of cutaneous locations, sub-cutaneous locations, appendages, trunk, neck and head. The method may further comprise the step of annunciating a selected adjusted temperature by the monitoring device. The audible alarm indication may be a time escalating volume audible alarm indication. The method may further comprise the step of providing an audible and text message display for alerting a caretaker of off-normal conditions. The method may further comprise the steps of calculating a cyclic redundancy check value within the sensor devices for the data to be transmitted, transmitting the cyclic redundancy check value with the temperature values, receiving the cyclic redundancy check values by the monitor device, computing a cyclic redundancy check value within the monitor device for the received data, and comparing the received and computed cyclic redundancy check value for error detection.

In an alternate embodiment of the present invention, a system for monitoring body temperature comprises sensor devices for measuring one or more temperature values at known locations on one or more bodies, the sensor devices for transmitting the measured temperature values and corresponding sensor identifications from the sensors to a monitoring device, a monitor device for receiving the measured temperature values and corresponding sensor identifications, the monitor device for computing adjusted temperature values from the measured temperature values based on the known body locations of the corresponding, and means for displaying the adjusted temperature values for use by a caretaker. The system may further comprise a wireless communication link for conducting the transmitted and received temperature values and sensor identifications between the sensor devices and the monitor device. The system may further comprise a wireless area network for conducting the transmitted and received temperature values and sensor identifications between the sensor devices and the monitor device. The system may further comprise a remote host application and a remote host display for displaying adjusted temperature values to a caretaker. The monitor device may comprise an antenna connected to a receiver for receiving wireless signals from sensor devices, the receiver connected to a processor and non-volatile storage for demodulating and formatting the wireless signals, a visual alarm indicator connected to the processor, an audible alarm indicator connected to the processor, a programmable keypad connected to the processor, a display connected to the processor, an external communication means connected to the processor, and a battery for powering the circuits in the monitor device. The system may further comprise a transmitter connected between the antenna and the processor and non-volatile storage for transmitting commands and data-to sensor devices. The battery may be replaced by a power supply connected to an alternating current power source. The system may further comprise a remote host application connected to the external communication means and a remote host display connected to the remote host application for displaying adjusted historical and current temperature values for use by caretakers. The system may further comprise a sensor registration table including an entry for each sensor assigned to the monitor, the sensor registration table comprising a sensor identification number, a unique sensor registration number assigned during sensor manufacture, a sensor position indicator, body age, and upper and lower alarm limits. Each sensor device may comprise an antenna connected to a transmitter for sending wireless signals to a monitor device, the transmitter connected to a processor for modulating data and generating wireless signals, a temperature sensor connected to the processor, a status indicator connected to the processor, and a battery for powering the circuits in the sensor device. The system may further comprise a receiver connected between the antenna and the processor for receiving commands and data from the monitor device. The system may further comprise the monitor device for computing adjusted temperature values from the measured temperature values based on the age of the body and time of day. The system may further comprise means for positioning the sensors at locations selected from the group consisting of cutaneous locations, sub-cutaneous locations, appendages, trunk, neck and head. The system may further comprise the monitor device for annunciating a selected adjusted temperature by the monitoring device. The system may further comprise an audible alarm indication provided by the monitor device that is a time escalating volume audible alarm indication. The system may further comprise an audible and text message display on the monitor device for alerting a caretaker to off-normal conditions.

Another embodiment of the present invention is a system for monitoring body temperature, including one or more sensor devices and a monitor device, the monitor device comprising means for receiving a measured temperature and sensor identification over a wireless link, a processor for controlling operation of the monitor device, means for computing an adjusted temperature value from the measured temperature value using a known body location of the measuring sensor, and means for displaying the adjusted temperature value for use by caretakers. Each sensor device may comprise means for measuring temperature at a known location of a body, a processor for controlling operation of the sensor device, and means for transmitting the measured temperature value and sensor identification over a wireless communication link. The system may further comprise means for computing an adjusted temperature value from the measured temperature value using the age of the body and time of day. The sensor may be positioned at a cutaneous location. The sensor may be positioned at a sub-cutaneous location.

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1A:
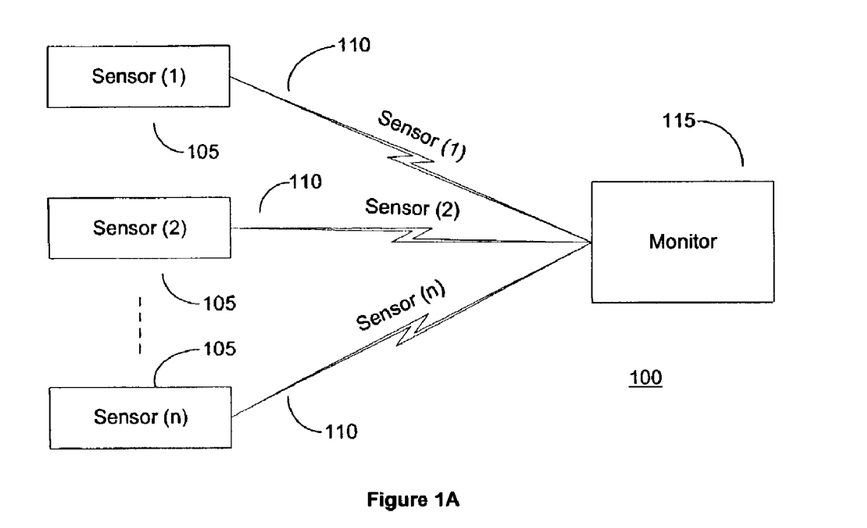
FIGS. 1A, 1B and 1C show system diagrams of alternative system embodiments of a single monitor communicating with a multiplicity of temperature sensors.
Figure 1B:
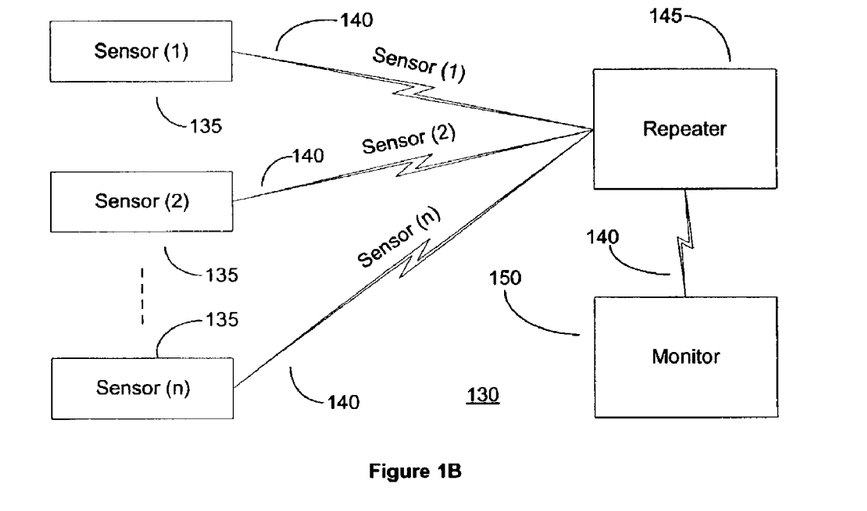
Figure 1C:
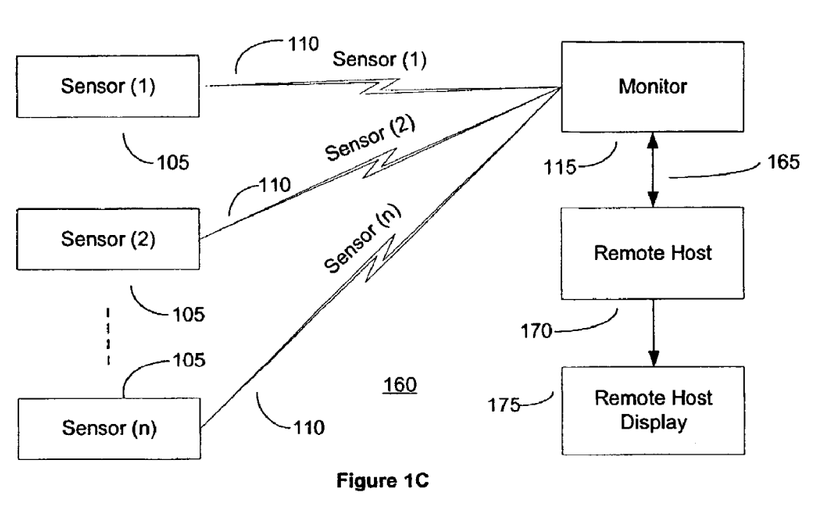

Turning now to FIG. 1, FIG. 1 shows diagrams in FIG. 1A 100, FIG. 1B 130, and FIG. 1C 160 of systems for sensing and monitoring the temperature at locations on a body that makes use of a wireless communication link. The embodiment system 100 of FIG. 1A depicts a single monitor 115 communicating directly with a multiplicity of sensors 105 via wireless communication links 110. An alternative embodiment system 130 of FIG. 1B depicts the use of a wireless area network 145 for linking a monitor 150 with a multiplicity of sensors 135 via a wireless area network 145 using communication links 140. The sensors 105, 135 are wireless devices that sense temperature at a specific location on an individual's body and transmit the temperature information. The monitor 115, 150 is a device that receives the transmitted temperature data from the sensors 105, 135 and processes the data for display to a caretaker. The communication links 110, 140 are capable of reliable communication over distances of several hundred feet within a home or institutional setting. FIG. 1C depicts an augmentation to the system of FIG. 1A 160, with the addition of a remote host application 170 connected to the monitor 115, and a remote host display 175 connected to the remote host application 170. In this configuration 160, the monitor 115 is typically configured without an internal display, and has the capability of interfacing to a variety of external devices via RS232 Serial, IrDA, USB, Parallel, Firewire or other compatible communication port types. This configuration 160 allows the monitor to be used in a clinical environment where the monitor is configured to observe numerous temperature sensors positioned on numerous bodies. A wide variety of processing and displays are available in this configuration 160. The wireless communication links may comprise any one of many communication configurations, including a wireless local area network (LAN) or a wireless personal area network (PAN).

Figure 2A:
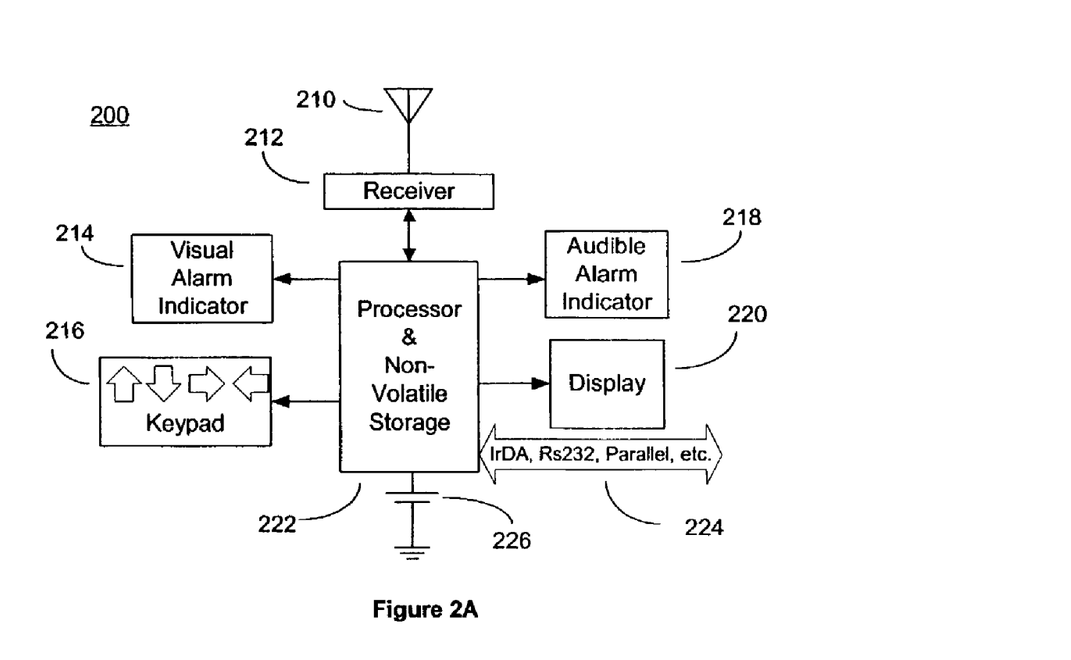
FIG. 2A and FIG. 2B show block diagrams of alternative embodiments of monitor devices.
Figure 2B:
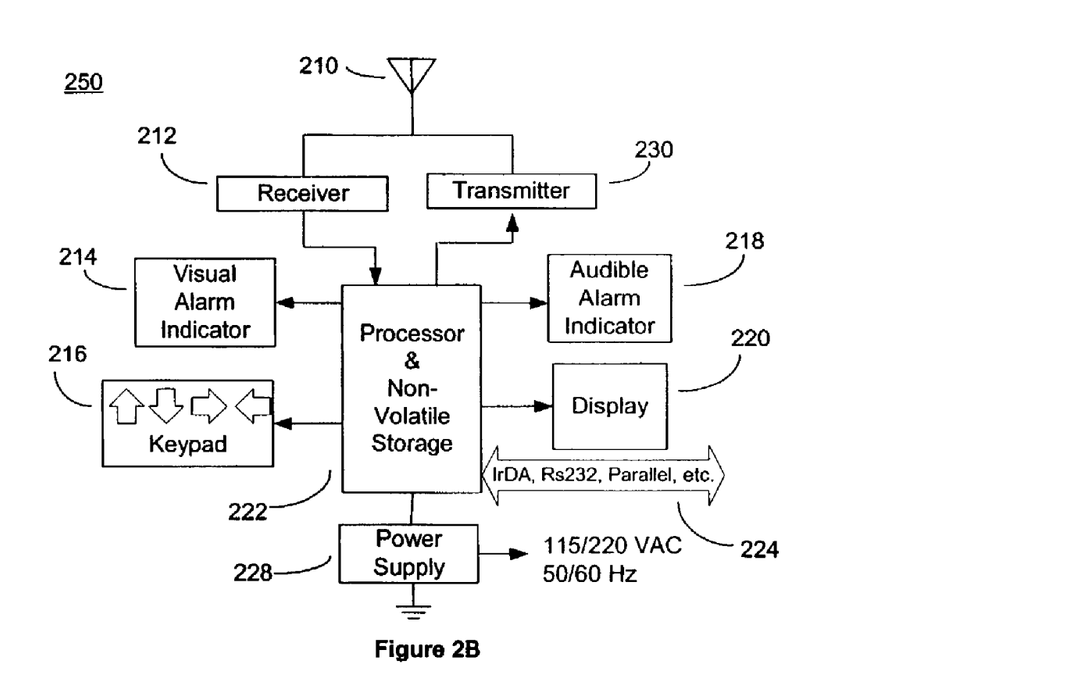
Figure 3:
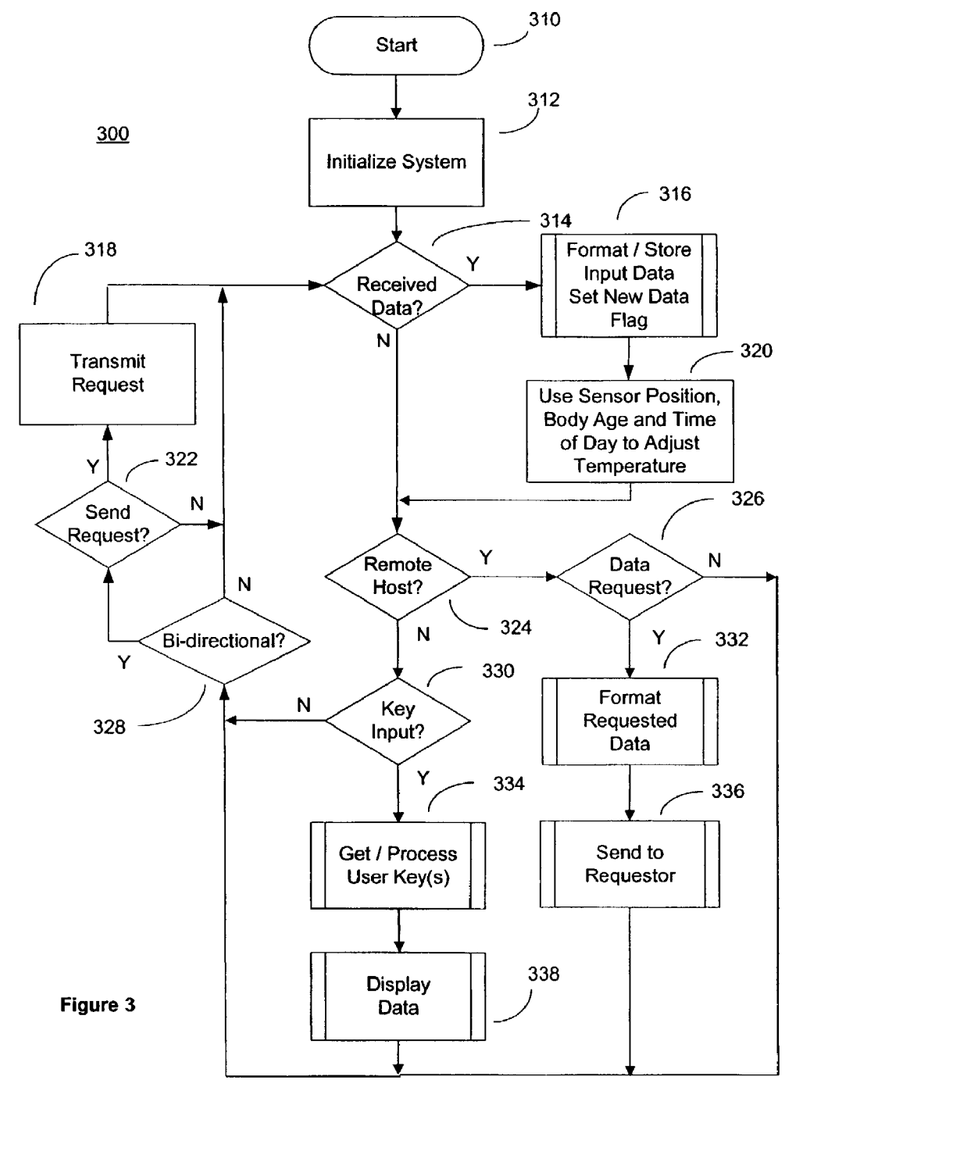
FIG. 3 shows a flow diagram that depicts monitor operation.

Turning now to FIG. 2, FIG. 2A and FIG. 2B show block diagrams of monitor devices 200, 250 for receiving, formatting, analyzing, and displaying temperature measurements from multiple assigned temperature sensors via wireless communication links. The monitor device 200, 250 alerts a caregiver when certain predefined conditions are occurring, such as temperature rising or falling, temperature has exceeded a certain value, a sensor battery life is minimal, intermittent reception from a sensor, and reception errors. These conditions may be displayed, and when enabled, alert the caregiver with various audible tones. The monitor device 200, 250 operates in a polling mode of operation, as depicted in FIG. 3. These configurations 200, 250 depict a monitor in a stand-alone mode and containing a user-friendly interface, such as an LCD 2×20 character display and up/down, right/left keypad, which allows a caretaker means to display the time and temperature of the sensors associated with the monitor. The monitor shown in FIG. 2A 200 depicts a unidirectional receive only monitor communication configuration, and the monitor shown in FIG. 2B 250 depicts a bi-directional transmit/receive monitor communication configuration. FIG. 2A depicts a monitor 200 that is battery operated and receives, formats, analyzes, alerts and displays temperature information supplied by each temperature sensor assigned to the monitor that is time and date stamped. Although the monitor 200 shown in FIG. 2A is powered by a battery 226, it may also receive power from a power supply, as shown in FIG. 2B, connected to an AC power source, typically 115/220 VAC, 50/60 Hz. In the receive only configuration of FIG. 2A, an antenna 210 connected to a receiver 212 receives formatted temperature data from multiple sensors via wireless communication links. The receiver 212 sends the formatted temperature data to a processor and non-volatile storage 222. A keypad 216 is also connected to the processor 222 to enable a user to select a designated temperature sensor for displaying the temperature sensor data on a display 220 connected to the processor 222. The monitor 200 also has a visual alarm indicator 214 and an audible alarm indicator 218 for alerting a caretaker when a settable alarm limit has been exceeded. An additional voice feature may be activated that allows the monitor to annunciate the temperature of the selected sensor over the audible alarm indicator 218. This feature is a software Implementation within the processor 222. The monitor may also have the capability of connecting to other devices for exchanging data through other standard communication means, such as IrDA communication, RS232 serial communication, parallel communication, USB, Firewire, etc. 224.

FIG. 2B differs from FIG. 2A in that the monitor 250 also has a transmitter 230 connected between the antenna 210 and the processor 222 for providing bi-directional wireless communication with multiple temperature sensors, and a power supply 228 connected to an AC power source for powering the circuits in the monitor 250. To make use of the bi-directional capabilities of the monitor 250, the associated sensors must also have bi-directional wireless communication capability. The bi-directional communication capability enables a monitor to send address, command and response messages to the temperature sensors. This capability may provide a more reliable communication format.

Turning now to FIG. 3, FIG. 3 shows a flow diagram that depicts monitor operation 300. The monitor is a device that receives, formats, analyzes and displays the information received from its assigned sensors. The monitor also has the capability of alerting a caretaker when designated predefined conditions occur, e.g., a temperature exceeding an alarm point. The monitor operates in a polling mode by sequentially reading temperature values received from temperature sensors. When a monitor is started 310 by applying power to the device, the monitor system is initialized 312. A test is then made to see if data has been received 314 from a sensor. If data is received 314, it is formatted and stored, and a new data flag is set 316. The sensor position on a body, the age of the body, and the time of day may be then used to compute an adjusted temperature 320. If data is not received 314, or after a new data flag has been set 316 and adjusted temperature computed 320, a test is made to determine if a remote host 324 is connected to the monitor. If there is a remote host 324 connected to the monitor and there is a data request 326 from the remote host, the requested data is formatted 332 and sent to the requestor host 336. Control is then directed to the step of testing for bi-directional communication 328. If there is a remote host 324 connected to the monitor and there is no data request 326 from the remote host, control is then directed to the step of testing for bi-directional communication 328. If there is no remote 324 host connected to the monitor, a test is made to determine if there has been a keypad input 330. If there has not been a keypad input 330, control is then directed to the step of testing for bi-directional communication 328. If there has been a keypad input 330, the user key input is processed 334 and associated data is displayed 338, and control is then directed to the step of testing for bi-directional communication 328. A test is conducted to determine if the monitor is utilizing bi-directional communication 328. If not, control is returned to the step of testing for the presence of received data 314. If bi-directional communication is being utilized 328, a test is made to determine if it is time to send a request to a sensor for data transfer 322. If not, control is returned to the step of testing for the presence of received data 314. If it is determined that a new data reading from a sensor is required 322, a transmit request is sent to an appropriate sensor 318 and control is returned to the step of testing for the presence of received data 314.

Figure 4:
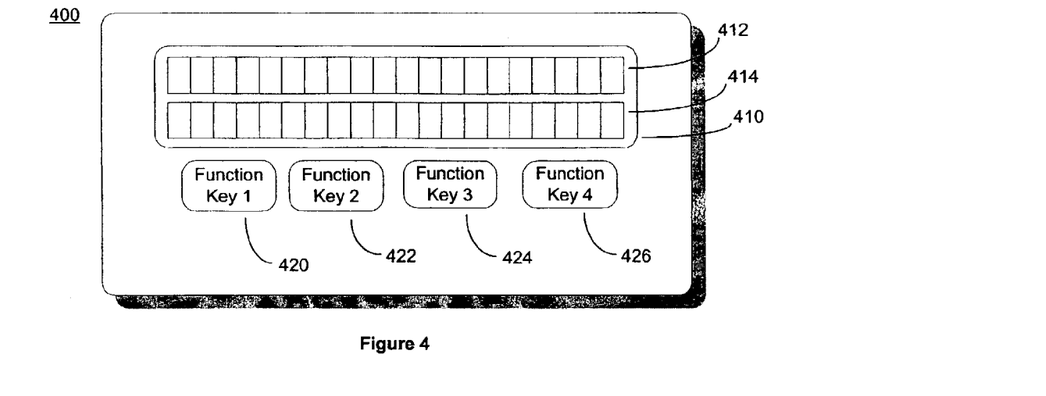
FIG. 4 shows a typical user interface for a stand-alone monitor.

Turning to FIG. 4, FIG. 4 shows a typical user interface 400 for a stand-alone monitor. The typical monitor user interface 400 may comprise a display 410 of two rows 412, 414 of 20 characters each using LCD display devices. Depending upon the target environment, a larger display such as a 4×20 or QVGA display may be configured into the monitor device. The first row of characters 412 could display information pertaining to a selected sensor reading, and the second row of characters 414 may be used to display functions relating to the function keys 420, 422, 424, 426. Although the display device is depicted as a 2×20 LCD character array, it may be any display device capable of displaying the required text and numbers.

Figure 5:
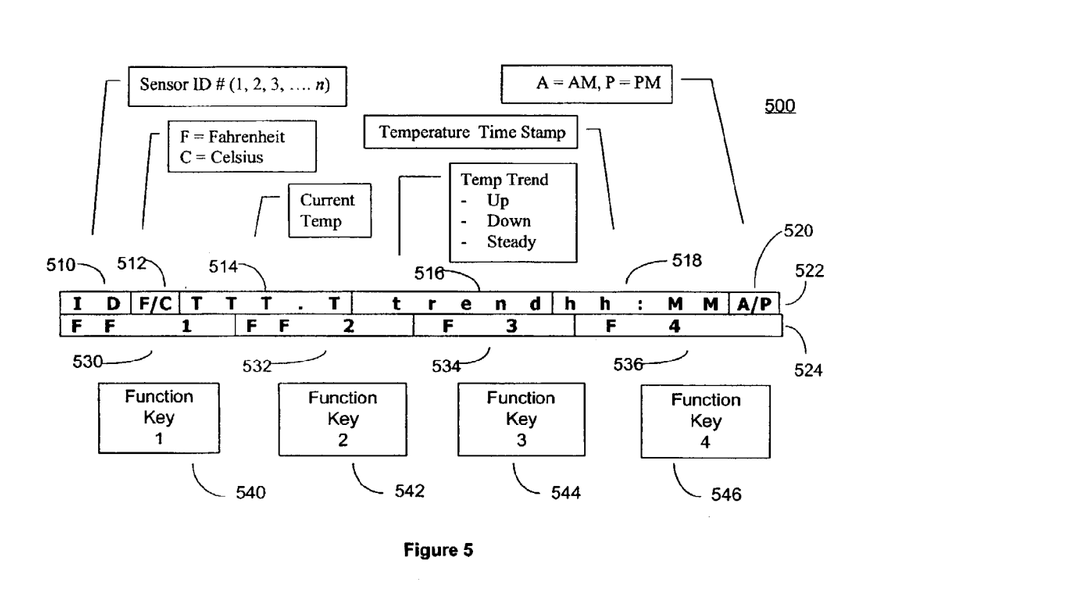
FIG. 5 shows a display definition for a stand-alone monitor.

Turning to FIG. 5, FIG. 5 shows a typical display definition 500 for a stand-alone monitor. A first row 522 may contain a sensor identification number 510, a Fahrenheit/Celsius indicator 512, a current temperature reading from the selected sensor 514, a temperature trend indication 516, a temperature time stamp 518, and an AM/PM indicator. A second row 524 may contain an indicator of the functions 530, 532, 534, 536 assigned to each of the four programmable function keys 540, 542, 544, 546 for providing a wide variety of functions for navigating displaying and setting conditions to be monitored.

Figure 6:
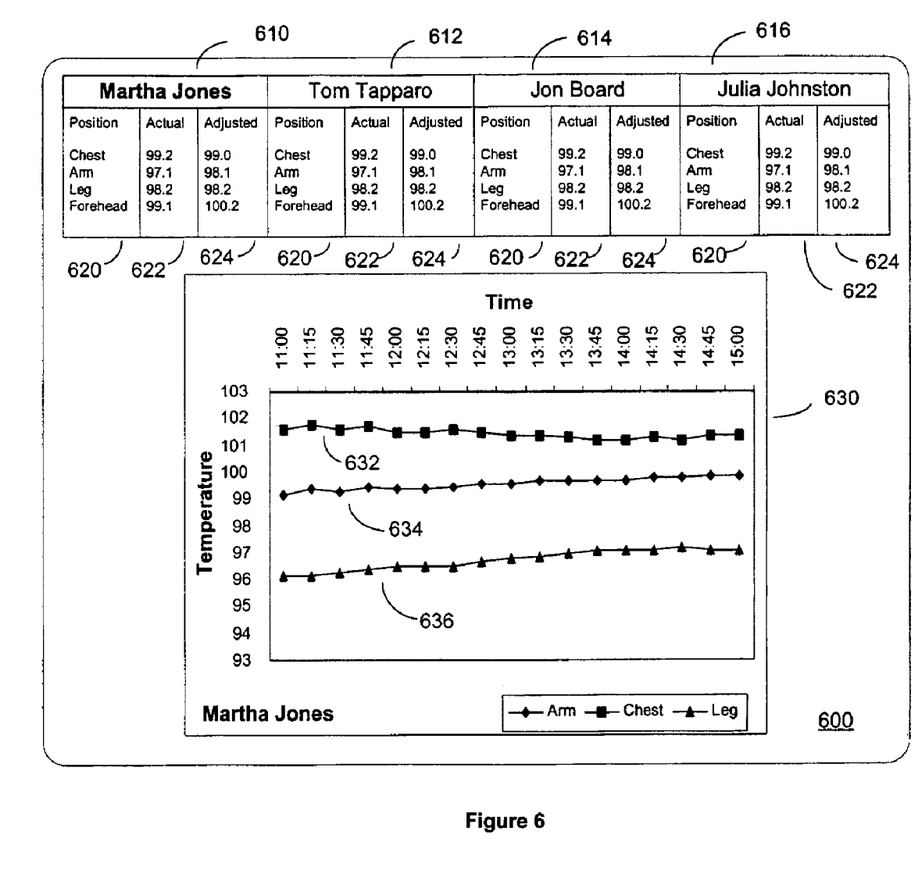
FIG. 6 shows an example of a remote host display.

Turning to FIG. 6, FIG. 6 shows an example 600 of a remote host display. A remote host display (175 in FIG. 1C)

connects to a remote host application (170 in FIG. 1C), which connects to a monitor (115 in FIG. 1C) for providing temperature data to the host application. The remote host display is controlled by the specific host application that may be provided for the environment in which it is being used, e.g., day care, nursery, neo-natal, etc. The example display shown in FIG. 6 depicts tabular information for several individuals 610, 612, 614, 616. The tabular information for each individual shows a column indicating the position of sensors located on different parts of an individual's body 620, a column showing actual temperature measurements 622 of the sensors, and a column showing temperature measurements adjusted for the position of the sensors, age of the body and time of day 624. By selecting one of the individuals 610, the host application creates graphs of selected temperatures 630 of the selected individual over a selected time period. The graphs shown in FIG. 6 shows temperature trends from a sensor located on the selected individual's chest 632, from a sensor located on the selected individual's arm 634, and from a sensor located on the selected individual's leg 636.

Figure 7A:
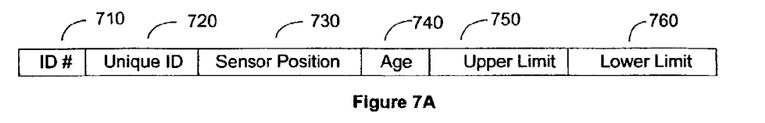
FIG. 7A identifies fields of a sensor registration table and FIG. 7B shows the lengths and definitions of the identified fields of the sensor registration table.
Figure 7B:
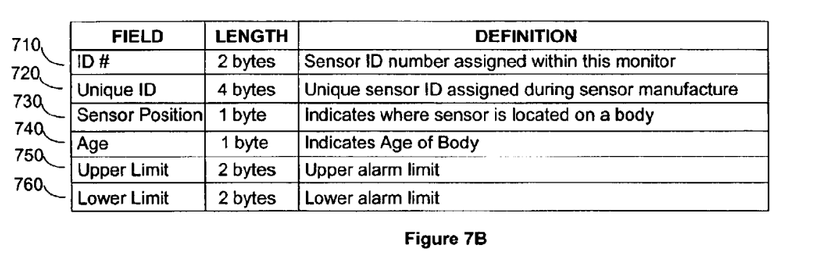

Turning to FIG. 7, FIG. 7 shows a definition of a sensor registration table entry. The sensor registration table is a dynamic table that contains specific information pertaining to a specific sensors assigned to a monitor. As each sensor is assigned, an entry is created in the table for that specific sensor. FIG. 7A identifies fields in sensor table entries, including ID# 710, Unique ID 720, Sensor Position 730, Age 740, Upper Limit 750, and Lower Limit 760. Each of these fields is identified, sized, and defined in FIG. 7B. The Sensor Position field 730 indicates which part of a body the sensor is associated with. Adjustment to the actual temperature reading may be applied, depending on the sensor location or area 730. Adjustment to the actual temperature reading may also be applied, depending on the age of the body or time of day 740. The Upper Limit field 750 and the Lower Limit field 760, values set by caretakers, are limits that can be used to generate an alarm condition to notify a caretaker when a temperature has exceeded the predefined limit value. An alarm condition may also be a rate of change or trend of temperature that is indicated by the Upper Limit field 750 and the Lower Limit field 760. The alarm condition may generate any combination of audible or visual alerts.

Figure 8A:
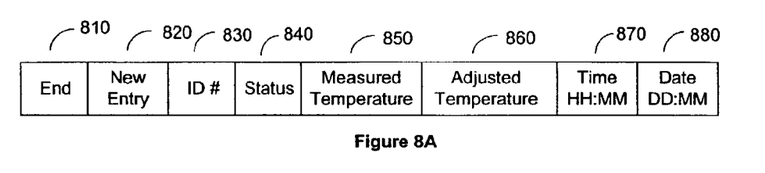
FIG. 8A identifies fields of a sensor data table.
Figure 8B:
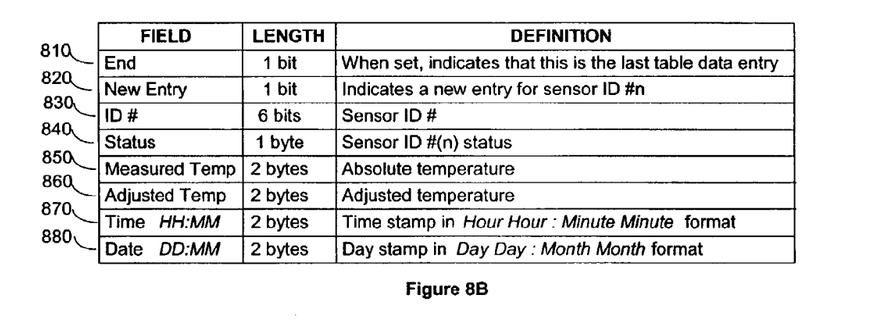
FIG. 8B shows the lengths and definitions of the identified fields of the sensor data table.
Figure 8C:
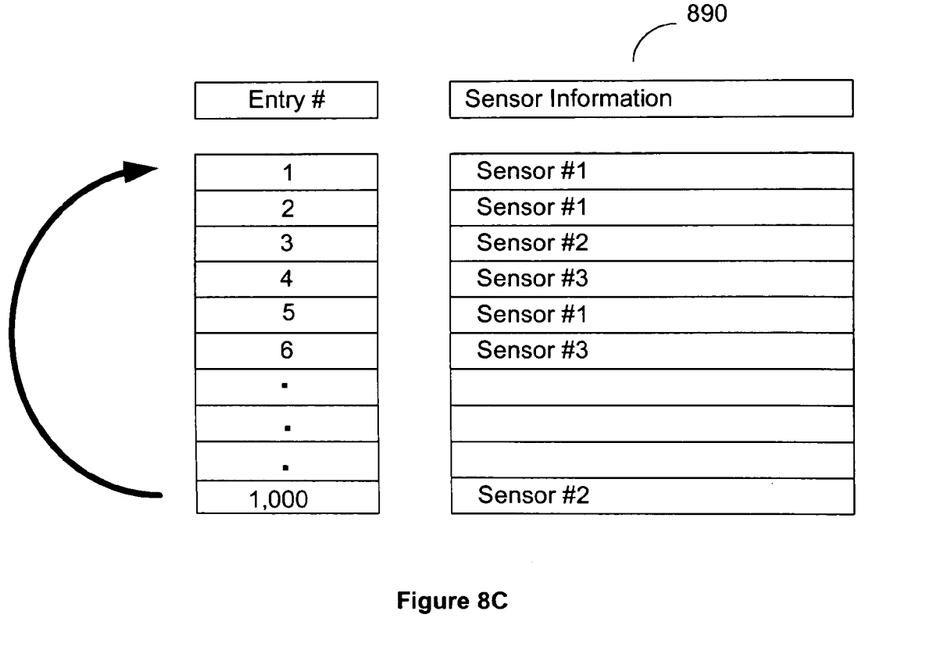
FIG. 8C depicts the variable length and circular nature of multiple sensor data tables.

Turning to FIG. 8, FIG. 8 shows a definition of a sensor data table entry. The sensor data table is a table used to archive sensor information as a monitor receives it. The table is circular in definition, in that once the last entry in the buffer has been used, the next location will be the first location in the table. The result is that old data from a particular sensor will be over-written by new data from that sensor. The sensor data table contains multiple entries for each sensor associated with a monitor. As sensor information is received from each sensor, the information received in the transmission is entered into the table. FIG. 8A identifies fields in the sensor data table, including End 810, New Entry 820, ID#830, Status 840, Measured Temperature 850, Adjusted Temperature 860, Time 870, and Date 880. Each of these fields is identified, sized, and defined in FIG. 8B. FIG. 8C depicts a multiple sensor data table. The multiple sensor data table is a dynamic table that contains all the information received by from each of the sensors 890 assigned to a monitor. It is variable in length and circular in nature. After the last entry (1,000 in the example of FIG. 8C) has been logged, the next information received from any of the three sensors will be written into entry #1 location.

Figure 9A:
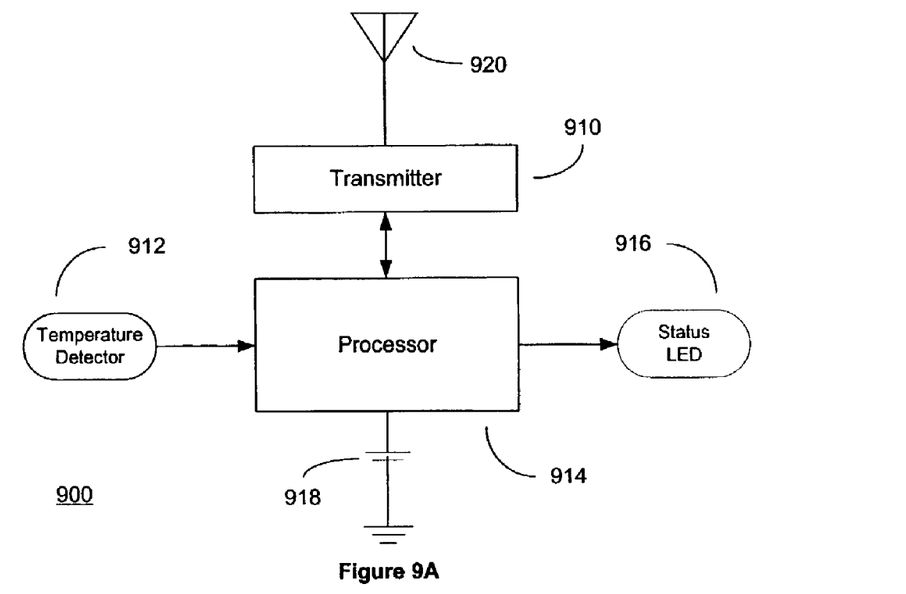
FIG. 9A depicts a sensor that has unidirectional communication capabilities and FIG. 9B depicts a sensor that has bi-directional communication capabilities.
Figure 9B:
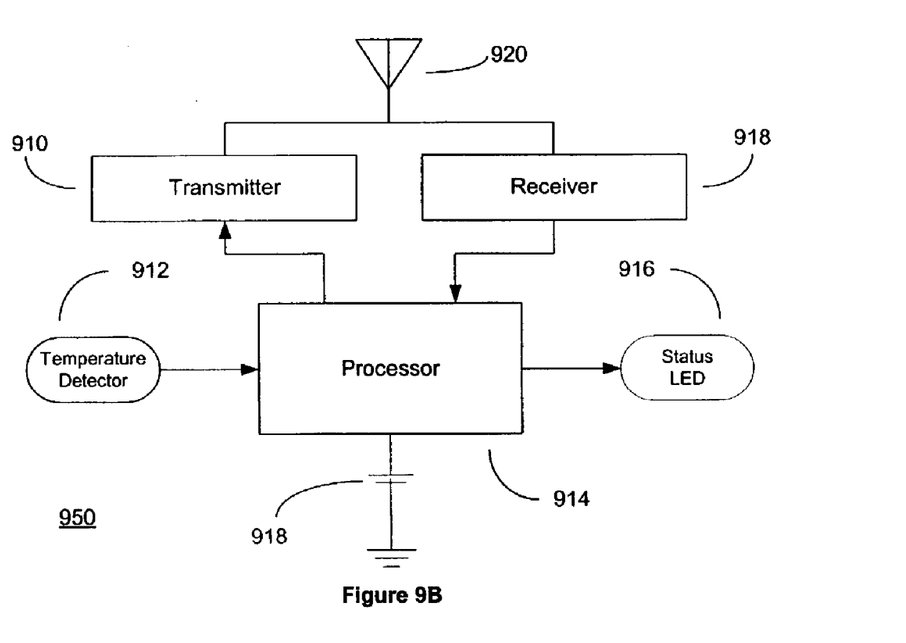

Turning to FIG. 9, FIG. 9 shows block diagrams of a sensor. FIG. 9A depicts a sensor that has unidirectional communication capabilities 900, and FIG. 9B depicts a sensor that has bi-directional communication capabilities 950. The sensor block diagram 950 of FIG. 9B is identical to that shown in FIG. 9A 900, but with the addition of a receiver 930 connected between the antenna 920 and the processor 914. The receiver 930 provides an additional capability of bi-directional communication to enables a sensor to receive address, command and response messages from a monitor. This capability may provide a more reliable communication format. The sensor 900, 950 is a self-contained battery operated wireless device that senses and transmits temperature to a monitor. The sensor 900, 950 contains all the necessary electronics and software to sense temperature, convert the sensed temperature data, format the data, and transmit the appropriate information. As shown in FIG. 9A, the sensor 900 comprises an antenna 920 connected to a transmitter 910 for transmitting information to a monitor. The transmitter 910 connects to a processor 914, which reads data from a temperature detector 912, and may activate a status LED 916. A battery 918 is provided to power the sensor 900. The sensor 900 may contain diagnostic programs running in the processor 914 for determining if the detector 912 is connected and for determining approximate remaining battery capacity. If a failure occurs that is detected by the diagnostic program, the LED 916 may be activated.

Figure 10:
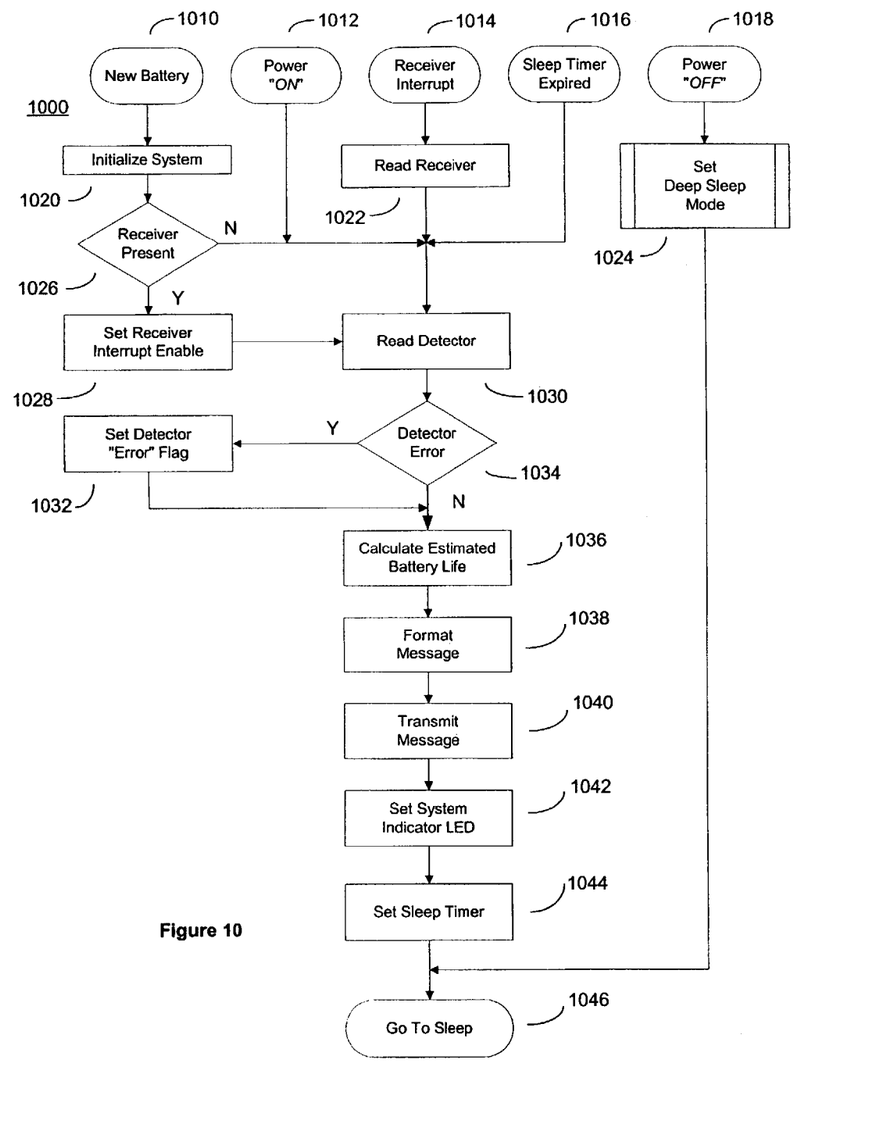
FIG. 10 shows a flow diagram that depicts sensor operation.

Turning to FIG. 10, FIG. 10 shows a flow diagram that depicts sensor operation 1000. The sensor operates as a polling device when activated. When a new battery is installed, or removed and reinstalled 1010, the sensor will initialize 1020. After initialization 1020, if an ON/OFF switch is in an ON position 1012 and there is no receiver present 1026, the sensor will start polling by reading the temperature detector 1030. If the ON/OFF switch is in the OFF position 1018, the sensor will enter a deep sleep mode 1024. All stored information is lost when a battery is removed. If there is a receiver present 1026, the sensor will set a receiver interrupt enable 1028 and initiate a polling operation by reading the temperature detector 1030. Subsequently, when a receiver interrupt occurs 1014, the sensor reads the receiver 1022 to identify a command and initiate a polling operation by reading the temperature detector 1030. During normal operation, the sensor will always put itself into some type of sleep mode to conserve battery power. The level of sleep depends on the ON/OFF switch. In the OFF position 1018, the sensor enters into a deep sleep mode 1024 whereby it only maintains its configuration parameters and enables interrupt capability. In the ON position, the sensor runs its polling loop, transmits information and then will enter into a predetermined sleep mode 1016. After the predetermined amount of time, the sensor will awake 1016 and conduct polling operations. The polling loop generally follows a repetitive sequence. After the temperature detector is read 1030, the sensor determines if a detector error has occurred 1034. If a detector error has occurred 1034, a detector error flag is set 1032 and the polling operation continues. If a detector error has not occurred 1034, the polling operation continues by calculating an estimated remaining battery life 1036, formatting a message to be transmitted 1038, transmitting the message to a monitor 1040, setting the system indicator 1042, setting a sleep timer 1044 and entering a normal sleep mode 1046 for a predetermined period of time or until a receiver interrupt occurs 1014. When the normal sleep timer has expired 1016 or a receiver interrupt occurs 1014, the polling operation is again initiated by reading the temperature detector 1030.

The sensor will continue to transmit information until the ON/OFF switch is placed in the OFF position or the battery is removed.

Figure 11A:
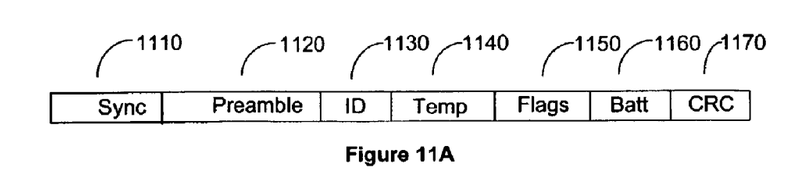
FIG. 11A identifies fields in a sensor data transmission and FIG. 11B shows the lengths and definitions of the identified fields in the sensor data transmission.
Figure 11B:
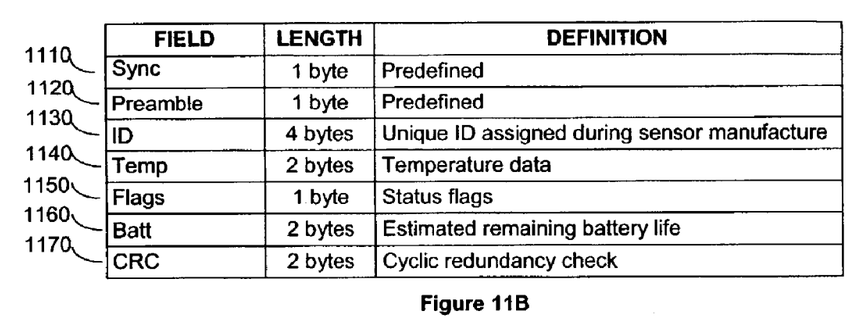

Turning to FIG. 11, FIG. 11 shows a definition of sensor transmission data. The sensor transmits data at a pre-determined interval. FIG. 11A identifies fields in a data transmission, including Sync 1110, Preamble 1120, ID 1130, Temp 1140, Flags 1150, Batt 1160 and CRC 1170. Each of these fields is identified, sized, and defined in FIG. 11B. The rate at which the sensor transmits information to the monitor may vary depending on the temperature sensing device used.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A method for monitoring body temperature, comprising the steps of:
   measuring one or more temperature values by sensors at known locations on one or more bodies;
   transmitting the measured temperature values and corresponding sensor identifications from the sensors to a monitoring device;
   receiving the measured temperature values and corresponding sensor identifications by the monitoring device;
   comparing the received sensor identifications with sensor identifications in a sensor registration table for determining a unique sensor manufacturer registration number, a sensor position, a body age, and alarm limits associated with each sensor;
   computing adjusted temperature values from the measured temperature values based on the known body locations of the corresponding sensors;
   storing the received measured temperature values, the adjusted temperature values, the sensor identification numbers, a sensor status, a time and date indication, an end indicator, and a new entry indicator as a sensor entry in a multiple sensor data table; and
   displaying the adjusted temperature values for use by a caretaker.

2. The method of claim 1, wherein:
   the step of measuring further comprises measuring at predetermined time intervals; and
   the step of transmitting further comprises transmitting at the predetermined time intervals.

3. The method of claim 1, wherein:
   the step of measuring further comprises measuring in response to requests received from the monitor; and
   the step of transmitting further comprises transmitting in response to the requests received from the monitor.

4. The method of claim 1, further comprising the step of calculating estimated remaining battery life of each sensor and transmitting the estimated battery life from each sensor to the monitoring device.

5. The method of claim 1, further comprising the step of detecting sensor errors/status, setting sensor error/status flags, and transmitting the sensor error/status flags from each sensor to the monitoring device.

6. The method of claim 1, further comprising the step of activating a sensor status indicator.

7. The method of claim 1, further comprising the step of switching the sensor to a low power mode when not measuring and transmitting.

8. The method of claim 1, wherein:
   the step of transmitting the measured temperature values comprises transmitting the measured temperature values via a wireless communication link; and
   the step of receiving the measured temperature values comprises receiving the measured temperature values via a wireless communication link.

9. The method of claim 1, wherein:
   the step of transmitting the measured temperature values comprises transmitting the measured temperature values via a wireless area network; and
   the step of receiving the measured temperature values comprises receiving the measured temperature values via a wireless area network.

10. The method of claim 1, wherein the step of displaying the adjusted temperature values comprises displaying the adjusted temperature values via a multi-line display.

11. The method of claim 1, wherein the step of displaying the adjusted temperature values comprises displaying the adjusted temperature values on a remote host display.

12. The method of claim 1, further comprising the step of selecting a sensor identification for displaying adjusted temperature values using a programmable keypad.

13. The method of claim 1, further comprising the step of providing visual alarm indication.

14. The method of claim 1, further comprising the step of setting upper and lower alarm limit values.

15. The method of claim 1, further comprising the step of setting upper and lower trend alarm limit values.

16. The method of claim 1, further comprising the step of computing adjusted temperature values from the measured temperature values based on the age of the body and time of day.

17. The method of claim 1, further comprising the step of positioning the sensors at locations selected from the group consisting of cutaneous locations, sub-cutaneous locations, appendages, trunk, neck and head.

18. The method of claim 1, further comprising the step of annunciating a selected adjusted temperature by the monitoring device.

19. The method of claim 1 further comprising the step of providing an audible and text message display for alerting a caretaker of off-normal conditions.

20. The method of claim 1, further comprising the steps of:
   calculating a cyclic redundancy check value within the sensor devices for the data to be transmitted;
   transmitting the cyclic redundancy check value with the temperature values;
   receiving the cyclic redundancy check values by the monitor device;
   computing a cyclic redundancy check value within the monitor device for the received data; and
   comparing the received and computed cyclic redundancy check value for error detection.

21. The method of claim 1, further comprising the step of providing audible alarm indication.

22. The method of claim 21, wherein the audible alarm indication is a time escalating volume audible alarm indication.

23. A system for monitoring body temperature, comprising:
   sensor devices for measuring one or more temperature values at known locations on one or more bodies;
   the sensor devices for transmitting the measured temperature values and corresponding sensor identifications from the sensors to a monitoring device;

a monitor device for receiving the measured temperature values and corresponding sensor identifications;

a sensor registration table in the monitor device for comparing the received sensor identifications with sensor identifications in a sensor registration table for determining a unique sensor manufacturer registration number, a sensor position, a body age, and alarm limits associated with each sensor;

the monitor device for computing adjusted temperature values from the measured temperature values based on the known body locations of the corresponding; and means for displaying the adjusted temperature values for use by a caretaker.

24. The system of claim 23, further comprising a wireless communication link for conducting the transmitted and received temperature values and sensor identifications between the sensor devices and the monitor device.

25. The system of claim 23, further comprising a wireless area network for conducting the transmitted and received temperature values and sensor identifications between the sensor devices and the monitor device.

26. The system of claim 23, further comprising a remote host application and a remote host display for displaying adjusted temperature values to a caretaker.

27. The system of claim 23, further comprising the monitor device for computing adjusted temperature values from the measured temperature values based on the age of the body and time of day.

28. The system of claim 23, further comprising means for positioning the sensors at locations selected from the group consisting of cutaneous locations, sub-cutaneous locations, appendages, trunk, neck and head.

29. The system of claim 23, further comprising the monitor device for annunciating a selected adjusted temperature by the monitoring device.

30. The system of claim 23, further comprising an audible alarm indication provided by the monitor device that is a time escalating volume audible alarm indication.

31. The system of claim 23, further comprising an audible and text message display on the monitor device for alerting a caretaker to off-normal conditions.

32. The system of claim 23, wherein each sensor device comprises:
an antenna connected to a transmitter for sending wireless signals to a monitor device;
the transmitter connected to a processor for modulating data and generating wireless signals;
a temperature sensor connected to the processor;
a status indicator connected to the processor; and
a battery for powering the circuits in the sensor device.

33. The system of claim 32, further comprising a receiver connected between the antenna and the processor for receiving commands and data from the monitor device.

34. The system of claim 23, wherein the monitor device comprises:
an antenna connected to a receiver for receiving wireless signals from sensor devices;
the receiver connected to a processor and non-volatile storage for demodulating and formatting the wireless signals;
a visual alarm indicator connected to the processor;
an audible alarm indicator connected to the processor;
a programmable keypad connected to the processor;
a display connected to the processor;
an external communication means connected to the processor; and
a battery for powering the circuits in the monitor device.

35. The system of claim 34, further comprising a remote host application connected to the external communication means and a remote host display connected to the remote host application for displaying adjusted historical and current temperature values for use by caretakers.

36. The system of claim 34, further comprising a transmitter connected between the antenna and the processor and non-volatile storage for transmitting commands and data to sensor devices.

37. The system of claim 36, wherein the battery is replaced by a power supply connected to an alternating current power source.

38. A system for monitoring body temperature, including one or more sensor devices and a monitor device, the monitor device comprising:
means for receiving a measured temperature and sensor identification over a wireless link; a processor for controlling operation of the monitor device;
means for comparing the received sensor identifications with sensor identifications in a sensor registration table for determining a unique sensor manufacturer registration number, a sensor position, a body age, and alarm limits associated with each sensor;
means for computing an adjusted temperature value from the measured temperature value using a known body location of the measuring sensor; and
means for displaying the adjusted temperature value for use by caretakers.

39. The system of claim 38, wherein each sensor device comprises:
means for measuring temperature at a known location of a body;
a processor for controlling operation of the sensor device; and
means for transmitting the measured temperature value and sensor identification over a wireless communication link.

40. The system of claim 38, further comprising means for computing an adjusted temperature value from the measured temperature value using the age of the body and time of day.

41. The system of claim 38, wherein the sensor is positioned at a cutaneous location.

42. The system of claim 38, wherein the sensor is positioned at a sub-cutaneous location.

* * * * *